Nov. 21, 1939.                J. D. MORGAN                2,180,602
                             ELECTRIC HOT PLATE
                            Filed Dec. 29, 1936
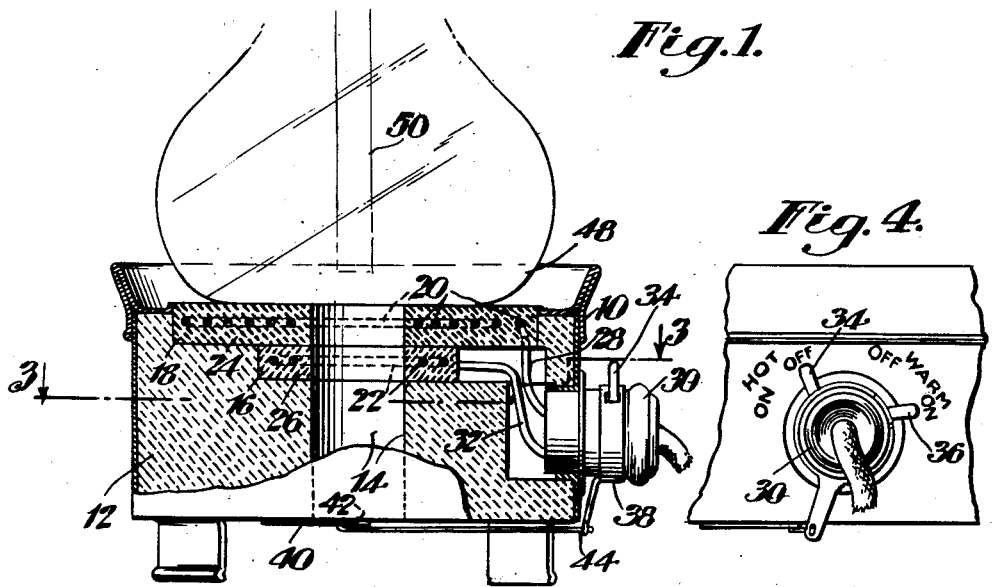
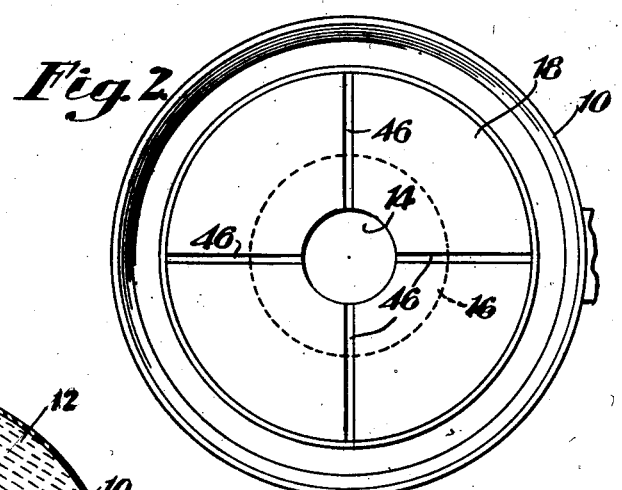
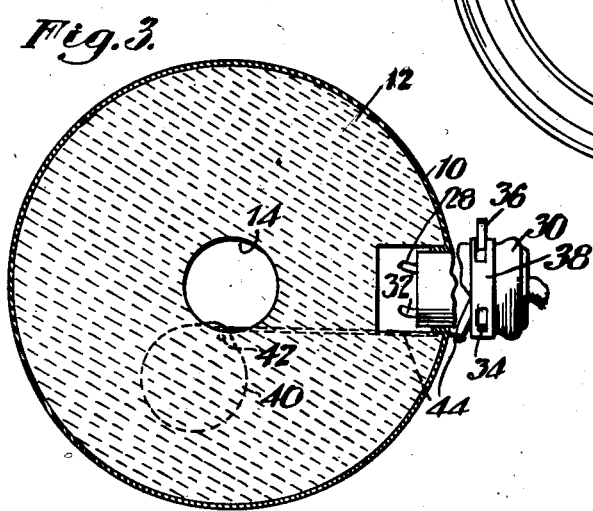
INVENTOR
JOHN D. MORGAN
BY
Edmund V. Worden
ATTORNEY Patented Nov. 21, 1939

2,180,602

UNITED STATES PATENT OFFICE 2,180,602

ELECTRIC HOT PLATE

John D. Morgan, South Orange, N. J., assignor to Power Patents Company, Hillside, N. J., a corporation of Maine Application December 29, 1936, Serial No. 118,058

8 Claims. (Cl. 219—37)

This invention relates generally to electric hot plates, and is more particularly directed to an improved form of electric hot plate adapted for boiling water and for brewing coffee.

The electric hot plates which are now generally available for domestic cooking are far from efficient when employed for boiling water or for other operations requiring a high rate of heating. For example it takes the ordinary electric hot plate about fifteen minutes to heat four cups of water in a kettle from air temperature to the boiling point. The same amount of water can be heated to boiling in six to seven minutes by the usual burner of a gas stove.

The primary object of the present invention is to provide an electric hot plate having a heating capacity substantially equal to that of a domestic gas stove burner.

A feature of the invention is based on the discovery that closed top electric hot plates having a heating capacity as high as 75 watts per square inch of exposed heating surface can be constructed by embedding a metal resistor constructed of a plurality of twisted fine strands of high temperature alloy metal wire in a refractory plate composed essentially of a mixture of milled grain zircon and silicon or ferrosilicon bonded with about 6% by weight of the mixture of phosphoric acid.

In brewing coffee, the best results are secured when fresh roasted and ground coffee is rapidly leached (extracted) with water at a temperature between 85° C. and 99° C., followed by rapid separation of the leach or extract solution from the coffee grounds. One of the most successful coffee brewing appliances consists essentially of a flat bottomed glass flask having a neck and an open top glass funnel which constitutes a leaching vessel supported above the flask with the stem of the funnel extending vertically into the flask through the neck to a point located within and just above the bottom of the flask; the stem of the funnel being removably secured within the neck of the flask by a rubber stopper or other suitable air and pressure tight closure for the flask. The apparatus also normally includes a strainer placed in the bowl of the funnel across the throat of the stem.

The preferred method of brewing coffee in this apparatus is to heat a measured amount of water to approximately boiling temperature within the flask, and to thereby develop sufficient air and steam pressure within the neck of the flask to raise the hot water out of the flask through the neck of the funnel into the funnel bowl. As soon as hot water enters the bowl a measured amount of the ground coffee is thoroughly wetted by the water with stirring, and the desirable components of the coffee are leached or extracted by the hot water within a period of not to exceed substantially three minutes. At the end of this short leaching period it is extremely important that the extract be rapidly drained out of the funnel back into the flask, because a longer leaching period results in extraction of undesirable constituents of the coffee thereby impairing the flavor of the brew.

It is therefore desirable that the rapid supply of heat to the flask at a rate sufficient to quickly boil the water therein, shal be terminated as soon as sufficient heat has been imparted to the water to develop the necessary pressure within the flask to transfer the hot water from the flask to the bowl of the funnel; and that thereafter the flask and particularly that portion of the base thereof immediately adjacent the bottom of the funnel stem shall be rapidly cooled to a temperature at which any steam within the flask shall condense and a vacuum be developed therein sufficient to insure rapid separation and return of the extract from the leaching vessel to the flask.

Another object of the present invention is therefore to provide an electric hot plate having a design which shall be adapted for rapid heating and cooling in accordance with the demands of a coffee brewing operation of the type heretofore discussed.

With the above and other objects and features in view the invention resides in the improved electric hot plate which is hereinafter described and more particularly defined by the accompanying claims.

In the following description reference will be made to the accompanying drawing, in which:

Fig. 1 is a view in vertical elevation, with parts shown in section, illustrating a preferred design of electric hot plate which is particularly adapted for boiling water and brewing coffee;

Fig. 2 is a plan view of the electric heater illustrated in Fig. 1;

Fig. 3 is a horizontal section of the heater taken on the line 3—3 of Fig. 1; and Fig. 4 is a view in front elevation illustrating the electric current control switch of the apparatus of Fig. 1 showing the operative connection of a damper regulating element therewith.

As shown in the drawing, the electric hot plate which forms the subject of the present invention preferably embodies a sheet metal frame or case 10, within which there is disposed a refractory base of low thermal conductivity member 12 which is annular in horizontal cross section and has a central aperture or bore 14. The upper surface of the base 12 is hollowed out as illustrated to accommodate a pair of superposed electric heating plates 16 and 18. The lower heating plate 16 is a warming plate of relatively low wattage capacity (about 120 watts) immediately surmounting the central part of the base 12 and having an annular horizontal section, with a central bore which is coaxial with and forms a continuation of the bore 14 through the base member. The upper heating plate 18 is a high wattage heater (about 1400 watts) surmounting the warming plate 16 and closely bonded thereto. The heater 18 is also annular in section, and has a central bore which is also coaxial with and forms a continuation of the bore 14 through the base member 12 and warming plate 16. Each of the plates 16 and 18 is constructed by embedding high temperature alloy metal conductors 20—22, respectively, in refractory shells 24 and 26 of strong, highly heat-conductive ceramic material.

The ends of the conductor 20 in the heater 18 are connected to lead wires 28 which serve for conducting electrical current from a source of supply through a switch 30 to the conductor. Likewise lead wires 32 form a separate circuit for conducting electrical current from the switch 30 to the metal conductors 22 in warming plate 16. The switch 30 is a compound switch provided with a pair of handles 34 and 36 each controlling through a switch supply of current to one of the heaters 16 and 18. Handle 34 controlling the switch regulating current supply to the hot plate, is operatively connected to a rotatable ring 38. As shown particularly in Figs. 1 and 3, a damper 40 is pivotally mounted on a pin 42 attached to the bottom of the refractory base member 12 adjacent the margin of bore 14. The damper 40 is mechanically and operatively connected to the switch ring 38 by a bell crank 44 so that when the electric current supply to the resistor 20 of hot plate 18 is cut off by the switch 34, the damper 40 is moved to a position such as illustrated in Fig. 3 permitting circulation of air upwardly through the bore 14; and on the contrary when the hot plate 18 is receiving current through the switch, the damper 40 is moved by the actuation of the switch 34 and ring 38 to a position where it forms a closure preventing circulation of air upwardly through the bore 14 in the heater.

As illustrated in Fig. 2, a plurality of radial grooves 46 are formed in the top surface of the hot plate 18 extending from the central bore to the periphery of the hot plate. These grooves function as passages through which air may circulate under natural draft through the bore 14 and under any vessel such as a flask 48 which may be mounted on the heating surface of the plate 18.

The principal elements of the electric heater consist of the low heat conductive base 12 preferably constructed of fire brick or porcelain which functions as an insulating base for a pair of superposed low and high capacity electric heating plates 16 and 18 which embody metal resistor coils embedded in and protected by ceramic shells of high thermal conductivity.

One suitable method of assembling the heater is to cast a fire brick base 12 which will fit within the metal casing 10, and to then cast or mold the heating plates 16 and 18, either separately or in the same operation, into a shape in which they can be mounted within grooves provided in the top surface of the base 12. The resistor 20 in the high heat capacity hot plate 18 is preferably constructed of not less than four twisted strands of not to exceed #22 gauge chromium-iron-aluminum alloy wire containing from 30% to 40% by weight of chromium and 5% to 8% by weight of aluminum, together with, in some cases, a small amount (not to exceed 5%) of cobalt. Resistors of this multi-fine-strand type remain electrically conductive and flexible at temperatures above 2400° F. at which temperatures a single resistor of the same cross sectional area becomes brittle and non-conductive apparently as the result of crystallization. The resistors of the hot plate and warming plate may also be constructed of other high temperature alloy wire, such for example as alloys containing 10%–40% chromium, 35%–80% nickel and smaller amounts of iron, aluminum and/or cobalt.

It is important that the heating plates 16 and 18 shall possess a high thermal conductivity and shall be intimately bonded together to insure rapid heat transfer from the top surface of the element 16 through the element 18. The shells 24 and 26 within which the resistors 20 and 22 are embedded, are therefore preferably constructed of a phosphoric acid bonded zircon-ferrosilicon refractory of the type described in the copending application of John D. Morgan and Russell E. Lowe, S. N. 87,662, filed June 27, 1936. This preferred zircon-ferrosilicon refractory is dark in color and possesses a thermal conductivity substantially equal to that possessed by cast iron. The preferred method of constructing these shells 24 and 26 consists briefly in mixing 40 to 50 parts by weight of milled grain zircon (thru 300 mesh) with 50 to 60 parts by weight of 80 mesh ferrosilicon (75% to 85% silicon), about 1% by weight of powdered aluminum hydrate, and about 6% by weight of the mixture of 85% ortho-phosphoric acid. The mixture is dampened with water to approximately the consistency of thick cream, after which the mixture is digested. After thorough agitation for a period of several hours at a temperature sufficiently high to drive off excess water, the dry digested mixture is crushed to a size which will pass an 80 mesh screen, again moistened with water to a creamy consistency, and poured into a mold of the desired shape in which the resistors are supported to thereby embed the resistors 20 and 22 to a depth of at least ⅛ inch below the top surface of the resulting plates 16 and 18. The heating plates thereby formed are then dried and fired, the optimum firing temperature being above the temperatures which the elements develop in use.

The electric heater of the present invention is particularly adapted for brewing coffee. Owing to the high wattage capacity of the hot plate 18, sufficient water to make four cups of coffee can be heated from normal temperature to boiling temperature within a flask 48 mounted on the top surface of the heater within a period of 6 to 8 minutes. During the period of heating the water within the flask the warming plate 16 will not be operating and the damper 40 will seal off the base of the central bore of the heater, thereby preventing circulation of air through the bore 14 and through passages 46. As soon as the water reaches boiling temperature within the flask, or even before the boiling temperature is reached, the switch 30 is operated to cut off the supply of current to the hot plate 18. Normally the supply of current to the hot plate 18 can be cut off a minute or two before the water reaches the boiling temperature, because of the great amount of heat which is stored in the refractory portion of the plate when operating the plate at a wattage capacity of say 75 watts per square inch of top surface, developing a temperature of 2200°–2400° F. At the same time that the supply of current to the resistor 20 in hot plate 18 is cut off by the switch 30, the damper 40 controlling circulation of air through the heater and under the vessel 48 opens to permit circulation of air for the purpose of cooling the bottom of the flask 48. This feature of the heater is particularly desirable in brewing coffee in accordance with the method previously discussed, in order to insure that the bottom of the flask adjacent the point where the lower end of the stem 50 of a coffee leaching funnel superimposed on the flask, can be cooled within a period of not to exceed three minutes, from a boiling temperature at which the water is elevated out of the flask through the stem 50 into the funnel, to a temperature at which condensation can take place within the flask, developing a vacuum permitting return of the water from the funnel to the flask. The warm plate 16 can then be placed in operation to hold the coffee beverage (i. e., extract) within the flask at a temperature which does not again rise to the boiling temperature. This warming plate should have sufficient capacity to develop about 6 watts per square inch of heating area at the top of the superposed hot plate.

The invention having been thus described, what is claimed as new is:

1. An electric heater comprising a heat insulating refractory base of low heat conductivity having an annular horizontal cross section with a central bore, a warming plate of low wattage capacity surmounting the base and having an annular cross section with a central bore coaxial with that of the base, a hot plate of high wattage capacity surmounting the warming plate and having an annular cross section with a central bore coaxial with that of the base, a pair of embedded metal resistors in heat conductant ceramic shells forming said plates, means including a switch for controlling the supply of electric current to one of two separate electrical circuits respecively embodying the resistors, and a damper for controlling the circulation of air upwardly through the central bore extending through the base plate, warming plate, and hot plate.

2. Apparatus as described in claim 1, including a plurality of radial grooves in the top work supporting surface of the hot plate extending from the central bore to the periphery of the plate, whereby air may circulate under natural draft through the central bore whenever the damper is open and whenever a vessel is mounted on the top surface of the plate.

3. Apparatus as described in claim 1 including a mechanical link operatively connecting the switch and the damper.

4. An electric heater comprising an electric warming plate, an electric hot plate mounted on the upper surface of the warming plate, said hot plate having a heating capacity greatly exceeding that of the warming plate, means including a switch for alternately supplying electric current to said plates, a ventilation passageway through said plates, and means for controlling the admission of air to said passageway.

5. An electric heater particularly adapted for brewing coffee in a vacuum type coffee pot, which comprises a pair of refractory electric heating plates having widely different heating capacities mounted together with the plate of higher capacity mounted on the upper surface of the plate of lower capacity, each of said plates including an embedded metallic resistance heating element, and means for supplying electric current to said plates, whereby the coffee pot may be rapidly heated to a desired high temperature by the plate of higher heating capacity and thereafter maintained at a relatively high temperature but substantially below said desired high temperature by the plate of lower heating capacity, and means for admitting air to the bottom of said pot through said plate of higher heating capacity after the pot has been heated to the desired high temperature to cool the pot.

6. An electric heater as defined by claim 4 in which said switch is mechanically connected to said ventilating means for correlated operation therewith.

7. An apparatus as defined by claim 1 in which the switch for said hot plate is operatively connected with said damper.

8. An electric heater as defined by claim 4 in which said air admission controlling means is operatively connected to said switch so that air is admitted to said passageway only when electric current is not being supplied to said hot plate.

JOHN D. MORGAN.